C. W. DIETRICH.
SUSPENSION CLAMP.
APPLICATION FILED APR. 15, 1916.
1,203,187.
Patented Oct. 31, 1916.
2 SHEETS—SHEET 1.
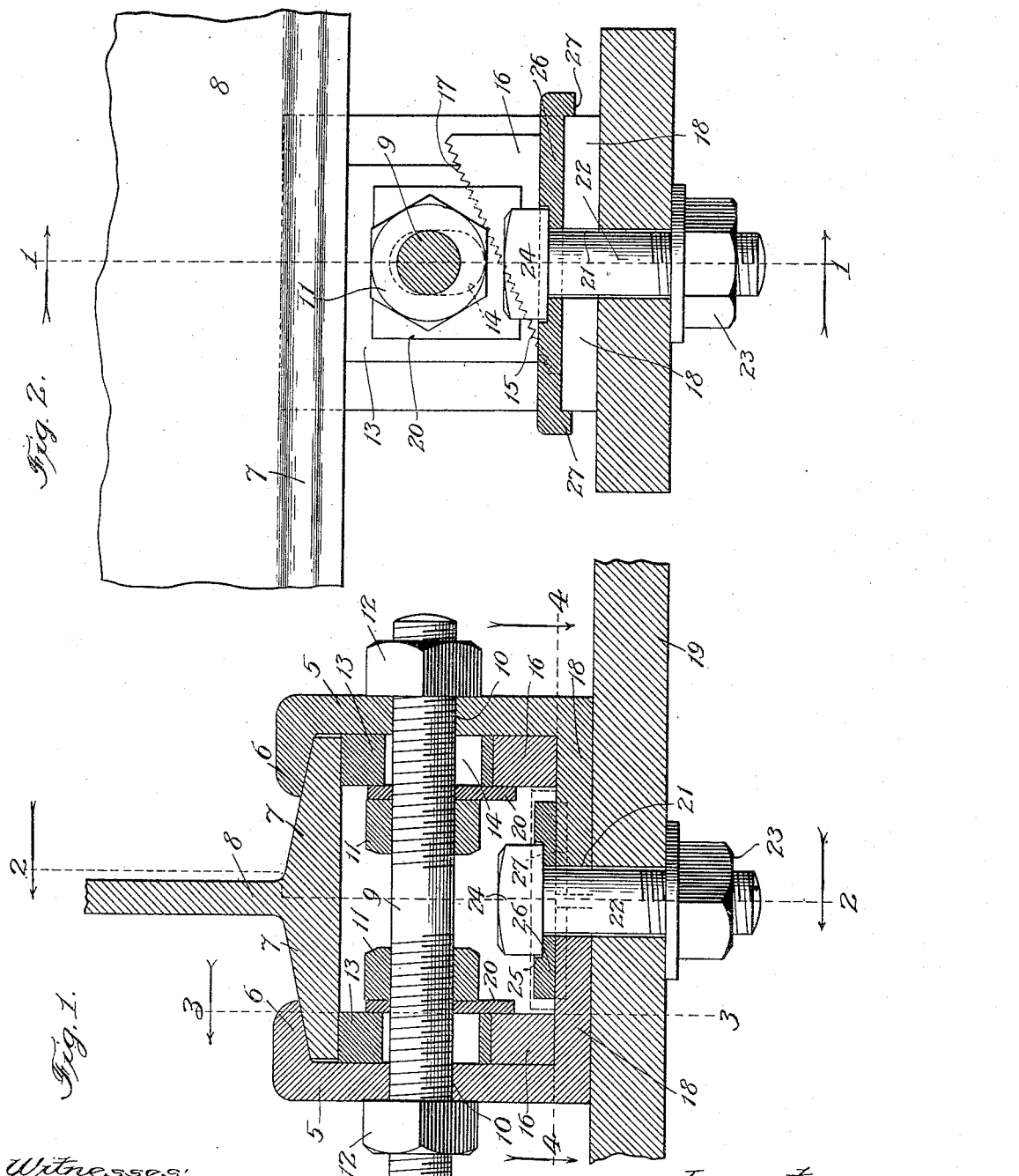
Inventor:
Charles W. Dietrich,
By Dyrenforth, Lee, Chritton and Wiles
Attys.

C. W. DIETRICH.
SUSPENSION CLAMP.
APPLICATION FILED APR. 15, 1916.
1,203,187.
Patented Oct. 31, 1916.
2 SHEETS—SHEET 2.
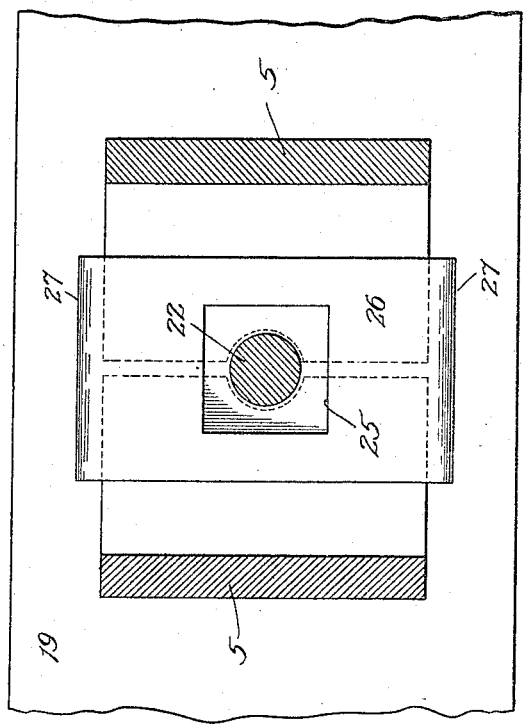
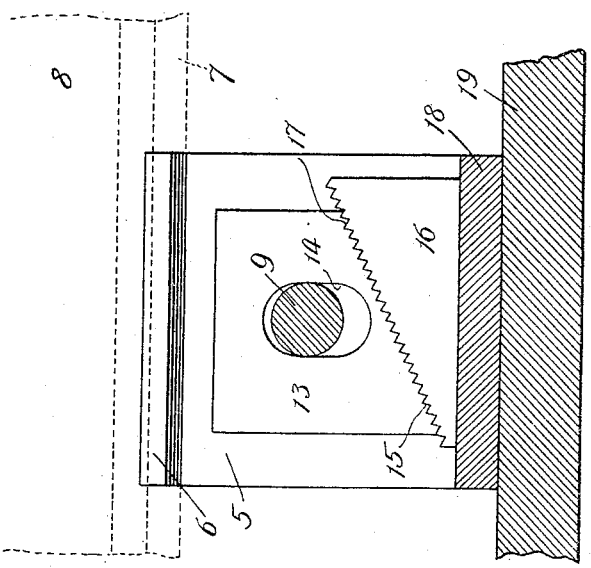
Inventor:
Charles W. Dietrich,
By Dyrenforth, Lee, Chritton and Wiles
Attys.

UNITED STATES PATENT OFFICE.

CHARLES W. DIETRICH, OF CHICAGO, ILLINOIS.

SUSPENSION-CLAMP.

1,203,187. Specification of Letters Patent. Patented Oct. 31, 1916.

Application filed April 15, 1916. Serial No. 91,328.

*To all whom it may concern:*

Be it known that I, CHARLES W. DIETRICH, a citizen of the United States, residing at Chicago, in the county of Cook and State of Illinois, have invented a new and useful Improvement in Suspension-Clamps, of which the following is a specification.

My invention relates to improvements in clamps, for suspending from overhead girders, or the like, shafting, machinery, pipes and other appliances and objects, the type of clamp to which my invention relates involving means for overlappingly engaging flanges on the overhead girders.

My objects, generally stated, are to provide a clamp of such construction that it may be applied to operative position on girders of different widths, and with base-flanges of different thicknesses, and which shall be of simple and economical construction and readily applied for use; and to provide improved, simple and economical means for suspending objects from the clamp.

Referring to the accompanying drawings—Figure 1 is a view in sectional elevation of the preferred form of my clamping device, showing it as applied to an I-beam girder, also shown in section and partly broken away, with a beam shown in section and partly broken, supported from the clamp, the section being taken at the line 1 on Fig. 2 and viewed in the direction of the arrow. Fig. 2 is a section taken at the line 2 on Fig. 1 and viewed in the direction of the arrow. Fig. 3 is a section taken at the line 3 on Fig. 2 and viewed in the direction of the arrow; and Fig. 4, a section taken at the line 4 on Fig. 1 and viewed in the direction of the arrow.

My improved clamp is provided, more particularly, for coöperation with the girders in a ceiling of a building, whether the girders be exposed or concealed in the finished structure, though it will be readily understood that the invention is not limited to such a structure.

My improved cap as I prefer to construct it, comprises a pair of similar jaw-members 5 provided along their upper edges with inwardly-extending flanges 6, at which the clamp is adapted to fit over the upper surfaces of the flanges 7 of the girder, such as that represented at 8, and from which the clamp is to be suspended; a bolt 9 threaded at its opposite ends and extending through apertures 10 in the jaw-members 5 below the flanges 6, the bolt carrying nuts 11 threaded thereon and extending at the inner sides of the members 5, and nuts 12 threaded on the bolt at the outer sides of said members; devices adjacent the jaw-members 5 and each comprising an upper block 13 having a vertically elongated opening 14 through which the bolt 9 extends, and having its lower side inclined, as represented at 15, and preferably serrated, and a lower block 16 having its upper surface oppositely inclined, as illustrated at 17, and also preferably serrated, the blocks 16 resting preferably on inturned flanges 18 on the lower ends of the jaw-member 5, against the lower surfaces of which latter the part to be suspended, as for example the beam represented at 19, and secured to the clamp as hereinafter described, bears, and washers 20 surrounding the bolt 9 and located between the nuts 11 and the blocks 13 and 16.

The flanges 18 are preferably provided at their opposed edges with openings 21, preferably of semi-circular shape, to receive a bolt 22 which passes through the beam 19 and carries a nut 23 on its lower threaded end. The head 24 of the bolt, which is of angular shape, is adapted to seat in a similarly shaped recess 25 in the upper surface of a block 26, which rests upon the upper surfaces of the flanges 18, and is held thereon against accidental displacement by depending flanges 27 which fit over the sides of the flanges 18, as represented in Fig. 2.

The manner of using my improved clamping means is as follows: Assuming that the clamp is to be applied to a girder, such as the girder 8, the nuts 11 are first screwed upon the bolt 9 from opposite ends thereof, and the washers 20 then applied to the bolt. The blocks 13 and jaw-members 5 are then applied successively to the bolt 9 to surround the latter and to cause the members 5 at their projections 6, to overlappingly engage the flanges 7 of the girder, the nuts 12 being then applied to the ends of the bolt 9. In the operation of applying the members 5 to the bolt 9, the bolt 22, inserted through the block 26, is introduced into the registering recesses 21 in the flanges 18 to position it in place and position the block 26 on these flanges. The blocks 16 are then inserted into place under the blocks 13 and adjusted relatively to the latter to cause the upper blocks 13 to snugly fit against the under-sides of the flanges 7, and the nuts 12 then tightened against the members 5. In this position of the parts, the serrations on the opposed inclined surfaces 15 and 17 hold the coöperating blocks 13 and 16 in adjusted position, and both the upper and lower blocks are held against lateral displacement by the washers 20. The blocks 13 and 16 thus serve to adapt the clamp to be applied to girders having flanges of varying thicknesses, and the adjustment of the various parts along the bolt 9 permits of the use of the clamp with girders having base-flanges of varying widths.

The bolt 22 serves as a means of attaching the beam 19 to the clamp, this being accomplished by positioning the beam to cause the bolt 22 to extend through an aperture therein, and then applying the nut 23 to the position illustrated in Fig. 1. The recess 25 in the block 26, which is held against turning, prevents the bolt 22 from turning, and serves this purpose regardless of the adjustment of the jaw-members crosswise of the girder 8, thus permitting single attaching means being employed for the beam.

While I have illustrated and described a particular construction of clamping means embodying my invention, I do not wish to be understood as intending to limit it thereto, as the same may be variously modified and altered without departing from the spirit of my invention.

What I claim as new, and desire to secure by Letters Patent, is:

1. A clamp of the character described, comprising a pair of members having projections at their upper ends for engagement with the support from which the clamp is to be suspended, means connecting said members together, and wedge-shaped members spaced from said projections and adjustable for varying the distance between them and said projections.

2. A clamp of the character described, comprising a pair of members having projections at their upper ends for engagement with the support from which the clamp is to be suspended and projections beneath said first-named projections, means connecting said members together, and wedge-shaped members bearing against said last-named projections and adjustable for varying the distance between them and said first-named projections.

3. A clamp of the character described, comprising a pair of members having projections at their upper ends for engagement with the support from which the clamp is to be suspended, a bar connecting said members together, and wedge-shaped members spaced from said projections and through which said bar extends, and adjustable for varying the distance between them and said projections.

4. A clamp of the character described, comprising a pair of members having projections on their upper ends for engagement with the support from which the clamp is to be suspended and projections beneath said first-named projections, means connecting said members together, and pairs of wedge-shaped blocks bearing against said last-named projections with the blocks of each pair adjustable relative to each other for varying the distance between them and said first-named projections.

5. A clamp of the character described, comprising a pair of members having projections at their upper ends for engagement with the support from which the clamp is to be suspended and projections beneath said first-named projections, a bar connecting said members together, and pairs of wedge-shaped blocks with said bar extending through one block of each pair, certain of said blocks bearing against said last-named projections and adjustable relative to the others of said blocks for varying the distance between them and said first-named projections.

6. A clamp of the character described, comprising a pair of members having projections at their upper ends for engagement with the support from which the clamp is to be suspended and projections beneath said first-named projections, a bar for connecting said members together, said bar passing through said members and carrying means for clamping said members together, blocks surrounding said bar adjacent each of said members and having inclined surfaces, and movable toward and away from said first-named projections, and other blocks bearing against said last-named projections and having inclined surfaces adapted to coöperate with the inclined surfaces of the first-referred to blocks.

7. A clamp of the character described, comprising a pair of members having projections at their upper ends for engagement with the support from which the clamp is to be suspended and projections beneath said first-named projections, a bar passing through said members and carrying means for clamping said members together, blocks surrounding said bar adjacent each of said members and having inclined surfaces and movable toward and away from said first-named projections, other blocks bearing against said last-named projections and having inclined surfaces adapted to coöperate with the inclined surfaces of the first-referred to blocks, and means for preventing displacement of said blocks.

8. A clamp of the character described, comprising a pair of members having projections at their upper ends for engagement with the support from which the clamp is to be suspended and projections beneath said first-named projections, a bar passing through said members and carrying means for clamping said members together, blocks surrounding said bar adjacent each of said members and having inclined surfaces and movable toward and away from said first-named projections, other blocks bearing against said last-named projections and having inclined surfaces adapted to coöperate with the inclined surfaces of the first-referred to blocks, washers on said bar positioned against the inner sides of said blocks, and means for holding said washers in position.

9. A clamp of the character described, comprising a pair of members having projections at their upper ends for engagement with the support from which the clamp is to be suspended, means connecting said members together, vertically-adjustable blocks located adjacent the inner surfaces of said members, and means adjustable in a plane at an angle to the planes through which said blocks are adjustable, for holding said blocks in different positions of vertical adjustment.

10. A clamp of the character described, comprising a pair of members having projections at their upper ends for engagement with the support from which the clamp is to be suspended, means connecting said members together, blocks located adjacent the inner sides of said members and adjustable vertically toward and away from said projections and having their lower edges inclined and provided with serrations, and other blocks having their upper surfaces inclined and serrated and opposing the inclined surfaces of said first-named blocks and adjustable transversely of the planes in which said first-named blocks are adjustable, for holding the latter in adjusted position.

11. A clamp of the character described, comprising a pair of members having projections at their upper ends for engagement with the support from which the clamp is to be suspended and flanges at their lower edges, means connecting said members together, a block resting on said last-named projections and containing an angular recess, means for holding said block against turning, and a bolt extending through said block and between said last-named projections and extending at its head into said recess, for the purpose set forth.

CHARLES W. DIETRICH.

Copies of this patent may be obtained for five cents each, by addressing the "Commissioner of Patents, Washington, D. C."